United States Patent [19]

Steelhammer et al.

[11] 4,342,733
[45] Aug. 3, 1982

[54] METHOD OF IMPROVING SULFITE ANTIOXIDANT PERFORMANCE IN HIGH SOLIDS SCRUBBERS

[75] Inventors: Joe C. Steelhammer, Lansdale; Paul J. Hutta, Warminster, both of Pa.

[73] Assignee: Betz Laboratories, Inc., Trevose, Pa.

[21] Appl. No.: 223,591

[22] Filed: Jan. 9, 1981

[51] Int. Cl.$^3$ ............................................. C01B 17/00
[52] U.S. Cl. ..................................... 423/242; 252/397; 252/400; 423/243; 423/512 A
[58] Field of Search ............... 423/242 A, 242 R, 243, 423/244 A, 244 R, 268, 270, 271, 512 A; 252/397, 400 A

[56] References Cited

U.S. PATENT DOCUMENTS 3,899,293 8/1975 Bush ................................. 252/400 A
3,918,521 11/1975 Snavely et al. ..................... 166/272

FOREIGN PATENT DOCUMENTS 49-43893 4/1974 Japan.
154242 7/1963 U.S.S.R. ............................. 423/270

OTHER PUBLICATIONS

Du Pont Chemical Fact Sheet on Du Pont Antioxidant No. 23.

*Primary Examiner*—O. R. Vertiz
*Assistant Examiner*—Gregory A. Heller
*Attorney, Agent, or Firm*—Alexander D. Ricci; Bruce E. Peacock

[57] ABSTRACT

An improved method for inhibiting sulfite oxidation in scrubber liquor of the type containing sulfite species is disclosed. A topping agent selected from the group consisting of polyphosphate compounds, and organophosphonic acid compounds, and mixtures thereof, is added to the scrubbing liquor to supplement and enhance the antioxidant activity of sulfite antioxidant agents such as the linear polyethyleneamines and substituted secondary and tertiary aromatic amines.

20 Claims, No Drawings

METHOD OF IMPROVING SULFITE ANTIOXIDANT PERFORMANCE IN HIGH SOLIDS SCRUBBERS

FIELD OF THE INVENTION

The present invention pertains to the utilization of certain phosphorus containing "topping" agents which are admitted into an aqueous gas scrubber medium to enhance the efficiency of sulfite antioxidant compounds which are also admitted to the aqueous scrubber medium. The aqueous scrubber medium is adapted to scrub $SO_2$ gas and typically comprises solids materials such as fly ash.

BACKGROUND OF THE INVENTION

A common problem faced in industry today is the removal of sulfur dioxide, an environmental pollutant formed by the oxidation of sulfur or sulfur-containing substances, from industrial exhaust gases. This pollutant is found as a component in various waste gases such as blast furnace gases, emission gases from certain chemical factories, and flue gases from coal or oil-burning furnaces used in utility plants. For example, in U.S. Pat. No. 3,918,521, to Snavely et al, a steam injection oil recovery system is disclosed wherein the flue gas from an oil-burning steam generator contains sulfur dioxide.

One widely accepted method for attacking this problem of sulfur dioxide removal is the use of wet scrubber systems in which sulfur dioxide-containing gases are intimately contacted with a scrubbing liquor. The scrubbing liquor is selective for sulfur dioxide due to the addition of certain chemicals such as lime, limestone or magnesium oxide.

When the sulfur dioxide-containing gas is contacted with the scrubbing liquor, these noted chemicals react with the sulfur dioxide to form a sulfite-containing reaction product which remains with the liquor, permitting the resulting relatively sulfur dioxide-free exhaust gas to pass on through the process stream. The thus spent scrubbing liquor is then circulated through a regeneration sidestream in which, as the name implies, the sulfur dioxide-selective chemicals are regenerated or replaced; and the thus replenished scrubbing liquor is recirculated into the wet scrubber system. It is due to the oxidation of this sulfite-containing reaction product in the spent scrubbing liquor that many problems arise, as will be illustrated below.

One major type of wet scrubber system for removing sulfur dioxide is known as the "limestone slurry system" in which the scrubbing liquor contains limestone as a sulfur dioxide-selective chemical. Upon contacting the sulfur dioxide-containing gas with the limestone slurry, sulfur dioxide is removed according to the reaction:

$$CaCO_3 + SO_2 + \tfrac{1}{2}H_2O \rightarrow CaSO_3 \cdot \tfrac{1}{2}H_2O + CO_2. \tag{1}$$

A major problem experienced with these systems is related to a secondary reaction in which the aqueous oxidation of sulfite to sulfate in the scrubbing liquor occurs. In the pH range of most scrubbers, the reaction is:

$$HSO_3^- + \tfrac{1}{2}O_2 \rightarrow SO_4^= + H^+, \text{ or} \tag{B 2}$$

$$SO_3^= + \tfrac{1}{2}O_2 \rightarrow SO_4^= \tag{3}$$

The negative consequences of this oxidation are several-fold as follows:

1. Calcium sulfate, a most tenacious scale, is formed and precipitates or crystallizes on various surfaces throughout the system. In contrast, the formation of calcium sulfite precipitate can be controlled in the scrubber by relying on the usually lower pH and hence favoring the formation of the more soluble bisulfite species:

$$CaSO_3 \cdot \tfrac{1}{2}H_2O \text{ or}$$
$$CaSO_3(\text{solid}) + H_2SO_3 \rightarrow Ca^{++} + 2HSO_3^- + \tfrac{1}{2}H_2O. \tag{4}$$

2. The pH of the scrubbing liquor drops (Equation 2), thus reducing the scrubber efficiency.

3. Examination of scale surfaces in scrubbers occasionally shows calcium sulfate to be the initial depositing species with other constituents forming on the calcium sulfate deposit.

A second major type of wet scrubber system for removing sulfur dioxide from a gas is known as the "double-alkali system" which contains a scrubbing loop and a separate precipitation loop. This system utilizes a sodium based scrubbing loop in which sulfur dioxide is removed from exhaust gas according to:

$$Na_2SO_3 + SO_2 + H_2O \rightarrow 2NaHSO_3. \tag{5}$$

If sodium hydroxide is also used, sulfur dioxide is removed according to:

$$NaOH + SO_2 \rightarrow NaHSO_3. \tag{6}$$

In the precipitation loop, the spent scrubbing liquor is regenerated by treatment with lime to precipitate the sulfite reaction product according to:

$$2NaHSO_3 + Ca(OH)_2 \rightarrow CaSO_3 + Na_2SO_3 + 2H_2O. \tag{7}$$

There are, indeed, drawbacks in the double-alkali system related to the oxidation of sulfite to sulfate in the scrubbing liquor. As opposed to the bisulfite ion, the sulfate ion is no longer regenerable and is of no further use in the process. This necessitates purging of the sulfate from the scrubbing liquor to avoid calcium sulfate scale. This purging results in the loss of sodium compounds from the scrubbing liquor, which compounds must be replaced at considerable expense by the addition of soda ash, usually to the scrubbing loop.

To inhibit the oxidation of the sulfite species, certain antioxidant agents have been added to the sulfite containing aqueous scrubber medium. For instance, in U.S. patent application Ser. No. 25,304, filed Mar. 30, 1979 (of common assignment herewith), there is disclosed the utilization of polyethyleneamine compounds, to achieve the desired sulfite antioxidation result. Japanese Pat. No. Sho 49-43893, published Apr. 25, 1974, discloses the use of certain aromatic amine sulfite antioxidant additives to effect the desired result.

Despite the advent and use of the above noted sulfite antioxidant additives, one problem that has been encountered in this procedure is that, in those instances wherein the aqueous scrubber medium contains solids, such as fly ash, the effectiveness of the antioxidant additives is reduced, probably due to adsorption of the antioxidant onto the solids particles. Also, the metal surfaces of the scrubber may act to reduce the activity of the antioxidant when used by itself.

Accordingly, it is apparent that there is a need in the art for a method and means for improving the efficacy of sulfite antioxidant agents, especially in those instances wherein solids matter, typically fly ash or the like particulate matter, is contained within the aqueous scrubber medium, or when the metal surfaces of the scrubber tend to reduce the activity of the antioxidant.

DETAILED DESCRIPTION OF THE INVENTION

The above and other problems inherent in the art are solved by the present invention. It has been surprisingly found that the addition of a phosphorus containing "topping" agent to the aqueous scrubber medium significantly enhances the performance of the sulfite antioxidant agent.

Typically, the "topping" agent is added to the aqueous medium in a range of about 1–100 parts "topping" agent per 1 million parts of said medium, depending upon the solids content of the aqueous medium. A preferred "topping" agent addition range, with respect to normally encountered scrubber aqueous mediums, is from about 0.1 to 25 parts "topping" agent to 1 million parts of the medium. In the most preferred range, the antioxidant agents are added to the aqueous medium in an amount of 0.5–10 ppm.

Although applicants are not to be bound by any particular theory of operation, it is believed that the phosphorus containing "topping" agent preferentially adsorbs onto the solids particles in the aqueous scrubber medium, leaving the antioxidant free to inhibit oxidation.

Preferably, separate feed points should be used for the "topping" agent and the antioxidant. The "topping" agent should be injected into the scrubber system at a point prior to and sufficiently removed from the antioxidant injection point. This sequential addition provides ample time for the "topping" agent to adsorb onto the solids and/or scrubber metal surfaces and hinder antioxidant deactivation by adsorption.

Sulfite antioxidants such as those disclosed in U.S. patent application Ser. No. 25,304, filed Mar. 30, 1979 (of common assignment herewith) may be utilized in combination with the novel "topping" agents herein disclosed. The entire content of the above commonly assigned U.S. patent application is hereby incorporated by reference.

Typically, the antioxidant is added to the aqueous scrubber medium in an amount as low as about 0.5 parts (weight) per million parts of the medium. The preferred lower limit is about 1 ppm. On the other hand, the upper limit could be as high as about 100 parts antioxidant per million parts of aqueous medium. Based on economic factors, 10 ppm is considered to be the most preferred upper limit. Of course, the amount of antioxidant added to a particular aqueous medium depends on known factors such as the nature and severity of the problem being encountered.

Specifically, the sulfite antioxidant agents may include linear, water soluble polyethyleneamines having the formula:

$$NH_2(CH_2CH_2NH)_xH$$

wherein X is greater than 1, and is preferably 2 to about 10. The following specific sulfite antioxidant compounds may be mentioned as exemplary:
diethylenetriamine
triethylenetetramine
tetraethylenepentamine
pentaethylenehexamine It is to be understood that the term polyethyleneamine as used herein shall also refer to any of the well known water soluble salts of these sulfite antioxidant compounds.

Other suitable antioxidant agents include aromatic amines, and water soluble salts thereof, having the formula:

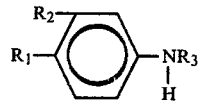

wherein
$R_1$=OH, $NHR_5$, lower alkyl having 1–3 carbon atoms, or,

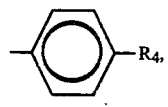

$R_2$=H, or OH with the proviso that $R_1$=OH when $R_2$=OH,
$R_3$=H, or lower alkyl having 1 to 3 carbon atoms,
$R_4$=H or $NHR_5$,
$R_5$=H, or lower alkyl having 1 to 3 carbon atoms.
Exemplary aromatic amine sulfite antioxidant agents include:
N,N dimethyl-p-phenylenediamine sulfate
N,N' di-sec-butyl-p-phenylenediamine
N,N' di-isopropyl-p-phenylenediamine
p-aminophenyl
p-aminobiphenyl
N-methylaniline
p-methylaniline
3,4-dihydroxyaniline As the "topping" agent which is to be added to the aqueous scrubber medium in addition to the sulfite antioxidant agent, water soluble polyphosphates, and organo-phosphonic acid compounds are efficacious.

The water soluble polyphosphate compounds which are operable for the present purposes generally include the sodium polyphosphates, the potassium polyphosphates, the lithium polyphosphates and ammonium polyphosphates. The following specific compounds may be listed as being exemplary:
$Na_5P_3O_{10}$ sodium tripolyphosphate
$Na_4P_2O_7$ tetrasodium pyrophosphate
$Na_2H_2P_2O_7$ disodium pyrophosphate
$(NaPO_3)_6$ sodium hexametaphosphate
$K_4P_2O_7$ tetrapotassium pyrophosphate
$Na_2(NH_4)_2P_2O_7$ sodium ammonium pyrophosphate
$Na_4HP_3O_{10}.1.5H_2O$ sodium acid tripolyphosphate
$K_5P_3O_{10}$ potassium tripolyphosphate
$Na_6P_4O_{13}$ sodium tetrapolyphosphate
$Na_3P_3O_9$ sodium trimetaphosphate
$Na_4P_4O_{12}$ sodium tetrametaphosphate
$(NaPO_3)_7$ sodium heptametaphosphate
$(NaPO_3)_8$ sodium octametaphosphate Additional polyphosphates which are utilizable under the present concept are set forth in the publication entitled "Phosphorus and its Compounds", J. R. Van Wazer, Volume 1, Interscience Publishers, New York, 1958.

The organo-phosphonic acid compounds, useful in conjunction with the present invention, are those having a carbon to phosphorus bond, i.e.,

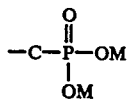

Compounds within the scope of the above description generally are included in one of perhaps 3 categories which are respectively expressed by the following general formulas (8, 9, 10):

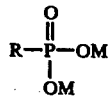 (8)

where R is a lower alkyl having from about one to six carbon atoms, e.g., methyl, ethyl, butyl, propyl, isopropyl, pentyl, isopentyl and hexyl, substituted lower alkyl of from one to six carbon atoms, e.g., hydroxyl and amino-substituted alkyls; a mononuclear aromatic (aryl) radical, e.g., phenyl, benzene, etc., or a substituted mononuclear aromatic compound, e.g., hydroxyl, amino, lower alkyl substituted aromatic, e.g., benzyl-phosphonic acid; and M is a water-soluble cation, e.g., sodium, potassium, ammonium, lithium, etc. or hydrogen.

Specific examples of compounds which are encompassed by this formula include:

methylphosphonic acid
$CH_3PO_3H_2$
ethylphosphonic acid
$CH_3CH_2PO_3H_2$
2-hydroxyethylphosphonic acid

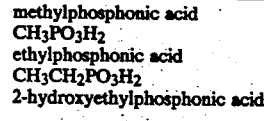

2-aminoethylphosphonic acid

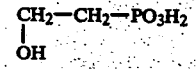

isopropylphosphonic acid

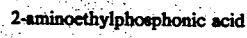

benzene phosphonic acid
$C_6H_5PO_3H_2$
benzylphosphonic acid
$C_6H_5CH_2PO_3H_2$

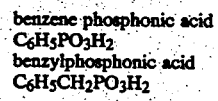 (9)

where $R_1$ is an alkylene having from about one to about 12 carbon atoms or a substituted alkylene having from about 1 to about 12 carbon atoms, e.g., hydroxyl, amino, etc. substituted alkylenes, and M is as earlier defined for (8) above. It is to be noted that oligomers, especially ester condensate oligomers, of the structure shown above in formula (9) are also useful for the present purposes. These oligomers are detailed in U.S. Pat. No. 4,237,005 (Becker).

Specific exemplary compounds and their respective formulas which are encompassed by the above formula (9) are as follows:

methylene diphosphonic acid
$H_2O_3PCH_2PO_3H_2$
ethylidene diphosphonic acid
$H_2O_3PCH(CH_3)PO_3H_2$
isopropylidene diphosphonic acid
$(CH_3)_2C(PO_3H_2)_2$
1-hydroxyethylidene 1,1-diphosphonic acid (HEDP)

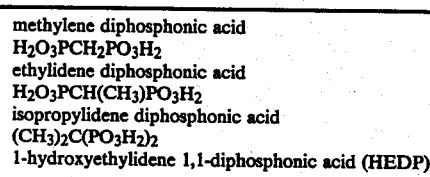

hexamethylene diphosphonic acid
$H_2O_3PCH_2(CH_2)_4CH_2PO_3H_2$
trimethylene diphosphonic acid
$H_2O_3P(CH_2)_3PO_3H_2$
decamethylene diphosphonic acid
$H_2O_3P(CH_2)_{10}PO_3H_2$
1-hydroxypropylidene 1,1-diphosphonic acid
$CH_3CH_2C(OH)(PO_3H_2)_2$
1,6-dihydroxy-1,6-dimethylhexamethylene-1,6-diphosphonic acid
$H_2O_3PC(CH_3)(OH)(CH_2)_4C(CH_3)(OH)PO_3H_2$
1,2-dihydroxy-1,2-diethylethylene-1,2-diphosphonic acid
$H_2O_3PC(OH)(C_2H_5)(OH)(C_2H_5)CPO_3H_2$

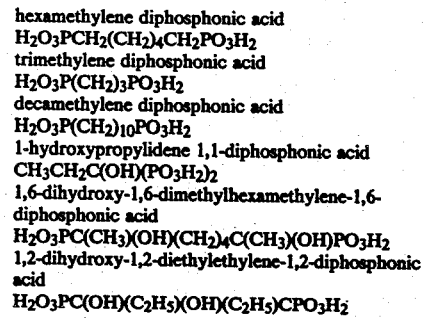 (10)

where $R_2$ is a lower alkylene having from about one to about four carbon atoms, or an amine or hydroxy substituted lower alkylene; $R_3$ is $[R_2-PO_3M_2]$, H, OH, $NH_2$, substituted amino, an alkyl having from one to six carbon atoms, a substituted alkyl of from one to six carbon atoms (e.g., OH, $NH_2$ substituted), a mononuclear aromatic radical and a substituted mononuclear aromatic radical (e.g., OH, $NH_2$ substituted); $R_4$ is $R_3$ or the group represented by the formula

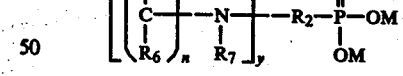

where $R_5$ and $R_6$ are each hydrogen, lower alkyl of from about one to six carbon atoms, a substituted lower alkyl (e.g., OH, $NH_2$ substituted), hydrogen, hydroxyl, amino group, substituted amino group, a mononuclear aromatic radical, and a substituted mononuclear aromatic radical (e.g., OH and amine substituted); $R_7$ is $R_5$, $R_6$, or the group $R_2-PO_3M_2$ ($R_2$ is as defined above); n is a number of from 1 through about 15; y is a number of from about 1 through about 14; and M is as earlier defined.

Compounds or formulas therefore which can be considered exemplary for the above formulas are as follows:

nitrilo-tri(methylene phosphonic acid)
$N(CH_2PO_3H_2)_3$

-continued imino-di(methylene phosphonic acid)
NH(CH$_2$PO$_3$H$_2$)$_2$
n-butylamino-N,N-di(methylene phosphonic acid)
C$_4$H$_9$N(CH$_2$PO$_3$H$_2$)$_2$
decylamino-N,N-di(methylene phosphonic acid)
C$_{10}$H$_{21}$N(CH$_2$PO$_3$H$_2$)$_2$
trisodiumpentadecylamino-N,N-dimethylene phosphonate
C$_{15}$H$_{31}$N(CH$_2$PO$_3$HNa)(CH$_2$PO$_3$Na$_2$)
n-butylamino-N,N-di(ethylene phosphonic acid)
C$_4$H$_9$N(CH$_2$CH$_2$PO$_3$H$_2$)$_2$
tetrasodium-n-butylamino-N,N-di(methylene phosphonate)
C$_4$H$_9$N(CH$_2$PO$_3$Na$_2$)$_2$
triammonium tetradecylamino-N,N-di(methylene phosphonate)
C$_{14}$H$_{25}$N(CH$_2$PO$_3$(NH$_4$)$_2$)(CH$_2$PO$_3$HNH$_4$
phenylaminodi-N,N-(methylene phosphonic acid)
C$_6$H$_5$N(CH$_2$PO$_3$H$_2$)$_2$
4-hydroxyphenylamino-N,N-di(methylene phosphonic acid)
HOC$_6$H$_4$N(CH$_2$PO$_3$H$_2$)$_2$
N-propylphenylamino-N,N-di(methylene phosphonic acid)
C$_6$H$_5$(CH$_2$)$_3$N(CH$_2$PO$_3$H$_2$)$_2$
tetrasodiummethylphenyl-N,N-aminodi(methylene phosphonic acid)
C$_6$H$_5$(CH$_2$)$_2$N(CH$_2$PO$_3$Na$_2$)$_2$
ethylene diamine-N,N,N',N'-tetra(methylene phosphonic acid)
(H$_2$O$_3$PCH$_2$)$_2$N(CH$_2$)$_2$N(CH$_2$PO$_3$H$_2$)$_2$
trimethylene diamine-N,N,N',N'-tetra(methylene phosphonic acid)
(H$_2$O$_3$PCH$_2$)$_2$N(CH$_2$)$_3$N(CH$_2$PO$_3$H$_2$)$_2$
heptamethylene diamine-N,N,N',N'-tetra(methylene phosphonic acid)
(H$_2$O$_3$PCH$_2$)$_2$N(CH$_2$)$_7$N(CH$_2$PO$_3$H$_2$)$_2$
decamethylene diamine-N,N,N',N'-tetra(methylene phosphonic acid)
(H$_2$O$_3$PCH$_2$)$_2$N(CH$_2$)$_{10}$N(CH$_2$PO$_3$H$_2$)$_2$
hexamethylene diamine-N,N,N',N'-tetra(methylene phosphonic acid)
(H$_2$O$_3$PCH$_2$)$_2$N(CH$_2$)$_6$N(CH$_2$PO$_3$H$_2$)$_2$
tetradecamethylenediamine-N,N,N',N'-tetra(methylene phosphonic acid)
(H$_2$O$_3$PCH$_2$)$_2$N(CH$_2$)$_{14}$N(CH$_2$PO$_3$H$_2$)$_2$
ethylenediamine-N,N,N'-tri(methylene phosphonic acid)
(H$_2$O$_3$PCH$_2$)$_2$N(CH$_2$)$_2$NHCH$_2$PO$_3$H$_2$
ethylenediamine-N,N'-di(methylene phosphonic acid)
H$_2$O$_3$PCH$_2$NH(CH$_2$)$_2$NHCH$_2$PO$_3$H$_2$
n-hexylamine-N,N-di(methylene phosphonic acid)
C$_6$H$_{13}$N(CH$_2$PO$_3$H$_2$)$_2$
diethylenetriamine-N,N,N',N'',N''-penta(methylene phosphonic acid)
(H$_2$O$_3$PCH$_2$)$_2$N(CH$_2$)$_2$N(CH$_2$PO$_3$H$_2$)(CH$_2$)$_2$N—(CH$_2$PO$_3$H$_2$)$_2$
ethanolamine-N,N-di(methylene phosphonic acid)
HO(CH$_2$)$_2$N(CH$_2$PO$_3$H$_2$)$_2$
n-hexylamino-N-(isopropylidene phosphonic acid)-N-methylene-phosphonic acid
C$_6$H$_{13}$N(C(CH$_3$)$_2$PO$_3$H$_2$)(CH$_2$PO$_3$H$_2$)
trihydroxymethylmethylamino-N,N-di(methylene phosphonic acid)
(HOCH$_2$)$_3$CN(CH$_2$PO$_3$H$_2$)$_2$
triethylenetetraamine-N,N,N',N'',N''',N'''-hexa(methylene phosphonic acid)
(H$_2$O$_3$PCH$_2$)$_2$N(CH$_2$)$_2$N(CH$_2$PO$_3$H$_2$)(CH$_2$)$_2$N—(CH$_2$PO$_3$H$_2$)(CH$_2$)$_2$N(CH$_2$PO$_3$H$_2$)$_2$
N-monoethanoldiethylenetriamine-N,N'',N'''-tri(methylene phosphonic acid)
HOCH$_2$CH$_2$N(CH$_2$PO$_3$H$_2$)(CH$_2$)$_2$NH(CH$_2$)$_2$N—(CH$_2$PO$_3$H$_2$)$_2$
chlorethyleneamine-N,N-di(methylene phosphonic acid)
ClCH$_2$CH$_2$N(CH$_2$PO(OH)$_2$)$_2$ The above listed compounds are included for illustration purposes and are not intended to be a complete listing of the compounds which are operable within the confines of the present invention.

SPECIFIC EMBODIMENTS OF THE INVENTION

The invention is illustrated by the following examples which are intended merely for purpose of illustration and are not to be regarded as limiting the scope of the invention or the manner in which it may be practiced.

Test Procedure 300 mls. of 0.02 M Na$_2$SO$_3$ solution were placed into a 500 ml Erlenmeyer flask. The solution was then stirred by means of a magnetic stirring device. In certain "runs", the resulting solution was heated to about 50° C. to simulate scrubber conditions. The pH of the solution was then adjusted to about 6.5 by the addition of 1.0 N HCl.

Fly ash solids, if required, were added to the solution in the desired amounts to result in a sulfite containing aqueous medium having the constituency proportions indicated in the tables hereinbelow. In certain "runs" metallic coupons were added to the resulting solutions so as to better approximate the physical conditions usually encountered within a scrubber. The antioxidant and "topping" agents were then added, when required, in the amounts indicated in the tables.

To determine the initial amount of SO$_3$= present in each solution, a 15 ml aliquot of the solution was removed from the flask and was filtered through a 0.2μ millipore filter. Ten mls of the filtrate were then placed in an Erlenmeyer flask. Titrimetric determination of the sulfite content was then undertaken utilizing potassium iodide/iodate solution as is detailed in Betz "Handbook of Industrial Water Conditioning", Eighth Edition; 1980, pages 411–12.

Immediately after the initial aliquot was removed, a gas bubbler, with 1.5 L/min. of CO$_2$ free air passing through it, was placed in the sulfite solution. At predetermined time intervals (as shown in the tables hereinbelow), additional aliquot samples of the sulfite containing solution were taken and sulfite content determination made therefor. For each sample, the following calculations were made:

1. ppm sulfite oxidized = (ppm sulfite initial) − (ppm sulfite at given sampling interval)

2. % sulfite oxidized = $\dfrac{\text{ppm sulfite oxidized}}{\text{ppm sulfite initial}} \times 100$ 3. % antioxidant activity =

$$\dfrac{\%\text{ sulfite oxidized in control} - \%\text{ sulfite oxidized at sampling interval}}{\%\text{ sulfite oxidized in control}}$$

EXAMPLES

In accordance with the above general testing procedures, the following examples and comparative examples were performed. The results and example parameters are set forth in the following tables.

TABLE I

| | 0.1% Fly Ash Solids | | |
|---|---|---|---|
| Treatment and Treatment Level | ppm Oxidized After 30 Minutes | Percent Oxidation After 30 Minutes | Percent Antioxidant Activity After 30 Minutes |
| Control | 434/396 | 31.20/30.00 | 0/0 |
| 5 ppm OP-2 | 229 | 18.39 | 39.90 |
| 2 ppm TEPA | 418 | 30.66 | 0 |
| 2 ppm TEPA/ 1 ppm OP-2 | 93 | 7.36 | 75.94 |
| 2 ppm TEPA/ 5 ppm OP-2 | 55 | 4.35 | 85.78 |

TABLE II

1.0% Fly Ash Solids

| Treatment and Treatment Level | ppm Oxidized After 30 Minutes | Percent Oxidation After 30 Minutes | Percent Antioxidant Activity After 30 Minutes |
|---|---|---|---|
| Control | 410/480 | 36.68/37.06 | 0/0 |
| 5 ppm TEPA/ 10 ppm OP-2 | 326 | 29.69 | 19.47 |
| 10 ppm TEPA/ 10 ppm OP-2 | 195 | 18.93 | 48.65 |
| 15 ppm TEPA/ 5 ppm OP-2 | 138 | 11.59 | 68.40 |
| 15 ppm TEPA/ 10 ppm OP-2 | 120 | 10.04 | 72.63 |

OP-2 = a phosphonate oligomer of 1-hydroxypropane-1,1-diphosphonic acid structure:

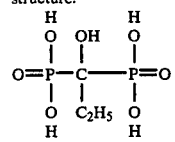

TEPA = tetraethylenepentamine

As shown in Tables I and II, combinations of tetraethylenepentamine and phosphonate are effective sulfite antioxidants when fly ash solids are present.

TABLE III

No Solids

| Treatment+ | % Oxidation | % Antioxidant Activity |
|---|---|---|
| Control | 30.76* | 0 |
| 1 ppm Dequest 2054 | 25.70 | 16.45 |
| 0.5 ppm TEPA | 23.26 | 24.38 |
| 1.0 ppm TEPA | 5.63* | 81.70 |
| 1 ppm TEPA/1 ppm Dequest 2054 | 7.35 | 76.10 |
| 0.5 ppm AO-23 | 30.62 | 0.45 |
| 1.0 ppm AO-23 | 1.60* | 94.80 |
| 1 ppm AO-23/1 ppm Dequest 2054 | 2.95 | 90.41 |
| 25 ppm TKPP | 24.60 | 20.03 |

+All treatment levels are ppm active.
*These numbers represent the average of two or more experiments.

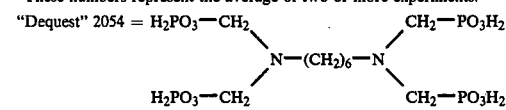

36% potassium salt solution (25% active acid) available Monsanto

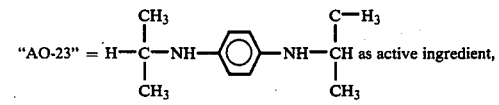

active ingredient = 50% (weight)
solvent = 50% (weight) 40/60 mixture of anhydrous methanol and isopropanol
available - DuPont.
TKPP = Tetrapotassium pyrophosphate

TABLE IV

Stainless Steel Coupon

| Treatment+ | % Oxidation | % Antioxidant Activity |
|---|---|---|
| Control | 37.15 | 0 |
| 1 ppm Dequest 2054 | 26.01 | 29.99 |
| 1 ppm TKPP | 32.60 | 12.25 |
| 1 ppm TEPA | 28.78* | 22.53 |
| 1 ppm TEPA/1 ppm Dequest 2054 | 7.81* | 78.98 |
| 1 ppm AO-23 | 30.40 | 18.17 |
| 1 ppm AO-23/1 ppm Dequest 2054 | 0.89 | 97.60 |
| 1 ppm AO-23/1 ppm TKPP | 8.69 | 76.61 |

+All treatment levels are ppm active.
*These numbers represent the average of two or more experiments.

TABLE V

0.1% Fly Ash

| Treatment+ | % Oxidation | % Antioxidant Activity |
|---|---|---|
| Control | 46.46* | 0 |
| 5 ppm Dequest 2054 | 27.23 | 41.39 |
| 2 ppm TEPA | 40.29 | 13.28 |
| 5 ppm TEPA | 8.73 | 81.21 |
| 2 ppm TEPA/2 ppm Dequest 2054 | 12.79 | 72.47 |
| 2 ppm TEPA/5 ppm Dequest 2054 | 4.61 | 90.08 |
| 2 ppm TEPA/5 ppm STPP | 8.80 | 81.06 |
| 2 ppm TEPA/5 ppm TKPP | 9.32 | 79.94 |

+All treatment levels are ppm active.
*These numbers represent the average of two or more experiments.
STPP = Sodium Tripolyphosphate

TABLE VI

1.0% Fly Ash

| Treatment+ | % Oxidation | % Antioxidant Activity |
|---|---|---|
| Control | 43.88* | 0 |
| 5 ppm Dequest 2054 | 32.75 | 25.36 |
| 50 ppm TKPP | 22.64 | 48.40 |
| 1 ppm TEPA | 44.92 | 0 |
| 5 ppm TEPA | 45.29 | 0 |
| 20 ppm TEPA | 16.32 | 62.81 |
| 50 ppm TEPA | 14.10 | 67.87 |
| 100 ppm TEPA | 12.25* | 72.08 |
| 1 ppm TEPA/1 ppm Dequest 2054 | 47.98 | 0 |
| 2 ppm TEPA/2 ppm Dequest 2054 | 44.25 | 0 |
| 5 ppm TEPA/5 ppm Dequest 2054 | 34.38 | 21.65 |
| 2 ppm TEPA/50 ppm STPP | 46.87 | 0 |
| 5 ppm TEPA/100 ppm STPP | 36.63 | 16.52 |
| 1 ppm AO-23 | 42.08 | 4.10 |
| 5 ppm AO-23 | 21.84 | 50.23 |
| 1 ppm AO-23/1 ppm Dequest 2054 | 38.00 | 13.40 |
| 2 ppm AO-23/2 ppm Dequest 2054 | 27.63 | 16.25 |
| 5 ppm AO-23/5 ppm Dequest 2054 | 18.44 | 57.98 |
| 2 ppm AO-23/25 ppm TKPP | 33.95 | 22.63 |
| 2 ppm AO-23/50 ppm TKPP | 9.00 | 79.49 |
| 1 ppm AO-23/100 ppm STPP | 17.12 | 60.98 |
| 2 ppm AO-23/50 ppm TKPP | 12.42 | 71.70 |
| 2 ppm AO-23/50 ppm TKPP | 17.60 | 59.89 |
| Control (50° C.) | 99.20 | 0 |
| 2 ppm AO-23/50 ppm TKPP (50° C.) | 34.37 | 65.35 |
| 2 ppm AO-23/100 ppm TKPP (50° C.) | 32.9 | 69.47 |
| 5 ppm AO-27/50 ppm TKPP (50° C.) | 31.94 | 67.80 |

+All treatment levels are ppm active.
*These numbers represent the average of two or more experiments.

When no solids were present (Table III), combinations of antioxidant and phosphonate were no more effective than the antioxidant alone. However, when solids were present, the antioxidants alone showed almost no activity except at extremely high treatment levels (Table VI).

Also examined were combinations of phosphates (TKPP and STPP) and antioxidants (Tables IV, V, VI). The results were comparable to those attained by use of the phosphonate/antioxidant combination. To a slight extent, the antioxidants exhibited better activity when combined with the phosphonates instead of the phosphates. However, since the phosphates are less costly, the use of high feed rates for products containing phosphate/antioxidant combinations may still be a cost-effective method of controlling sulfite oxidation in medium to high solids scrubber systems.

In Table III wherein no solids were present, 1 ppm of either N,N'-diisopropyl-p-phenylenediamine or tetraethylenepentamine exhibited good antioxidant activity. 1 ppm of "Dequest" 2054 and 25 ppm TKPP, by themselves, showed only slight antioxidant activity.

When a stainless steel coupon was introduced into the system (Table IV), both antioxidants lost their activity. The combination of 1 ppm Dequest 2054 and 1 ppm of either antioxidant increased the antioxidant activity significantly in the presence of the stainless steel coupon. A combination of 1 ppm AO-23/1 ppm TKPP also worked, but to a slightly lesser extent.

The fly ash used in the Table III–Table VI examples and comparative examples was obtained from a midwestern public service company. It was first washed to remove a majority of the soluble surface ions. With 0.1% fly ash (Table V), 2 ppm TEPA shows almost no antioxidant activity. However, a combination of 5 ppm Dequest 2054 and 2 ppm TEPA increased the antioxidant activity significantly. Additional examples using 2 ppm TEPA/5 ppm TKPP and 2 ppm TEPA/5 ppm STPP were also undertaken (Table V). Both of these combined treatments exhibited substantial increases in antioxidant activity relative to TEPA alone.

With 1% fly ash present (Table VI), typical feedrates of 2 ppm antioxidant and 50 ppm phosphate were needed to effectively inhibit oxidation. Here, it is noted that AO-23 showed better antioxidant activity than TEPA. Also, TKPP was observed to be a better "topping" agent than STPP.

TABLE VII

No Solids

| Treatment and Treatment Level | ppm Oxidized After 30 Minutes | Percent Oxidation After 30 Minutes | Percent Antioxidant Activity After 30 Minutes |
|---|---|---|---|
| Control | 323/342/371 = $\bar{x}$ = 345 | 24.41/26.47/ 27.00 25.96 = $\bar{x}$ | 0/0/0 $\bar{x}$ = 0 |
| 3 ppm DETA | 361 | 26.25 | 0 |
| 6 ppm DETA | 163 | 13.22 | 49.08 |
| 2 ppm PEHA | 13 | 0.99 | 96.19 |

DETA = diethylenetriamine
PEHA = pentaethylenehexamine

TABLE VIII 0.170% Fly Ash

| Treatment and Treatment Level | ppm Oxidized After 30 Minutes | Percent Oxidation After 30 Minutes | Percent Antioxidant Activity After 30 Minutes |
|---|---|---|---|
| Control | 393/511 558/460 500 $\bar{x}$ = 484 | 36.39/42.65/ 42.44/39.48 41.56 $\bar{x}$ = 40.51 | 0/0/0/0/0 $\bar{x}$ = 0 |
| 6 ppm DETA | 475 | 38.15 | 5.83 |
| 15 ppm DETA | 215 | 19.03 | 53.02 |
| 6 ppm DETA/ 5 ppm Deq. 2054 | 16 | 1.49 | 96.32 |
| 6 ppm DETA/ 25 ppm TKPP | 151 | 12.58 | 68.94 |
| 2 ppm Deq. 2054+ | 260 | 24.35 | 39.44 |
| 5 ppm STPP+ | 337 | 32.88 | 18.83 |
| 5 ppm TKPP+ | 258 | 24.27 | 40.09 |
| 2 ppm AO-23 | 158 | 13.88 | 65.74 |
| 2 ppm AO-23/ 2 ppm Deq. 2054 | 0 | 0 | 100.00 |
| 2 ppm AO-23/ 5 ppm Deq. 2054 | 0 | 0 | 100.00 |
| 5 ppm. Deq. 2000+ | 180 | 16.36 | 59.61 |
| 5 ppm Deq. 2010+ | 257 | 22.16 | 45.29 |
| 2 ppm TEPA/ 5 ppm Deq. 2000 | 153 | 14.32 | 64.65 |
| 2 ppm TEPA/ 5 ppm Deq. 2010 | 25 | 2.34 | 94.22 |
| 5 ppm TEPA/ 5 ppm Deq. 2000 | 0 | 0 | 100.00 |

TABLE VIII-continued 0.170% Fly Ash

| Treatment and Treatment Level | ppm Oxidized After 30 Minutes | Percent Oxidation After 30 Minutes | Percent Antioxidant Activity After 30 Minutes |
|---|---|---|---|
| 2 ppm PEHA | 420 | 37.83 | 6.66 |
| 5 ppm PEHA | 79 | 6.13 | 84.86 |
| 2 ppm PEHA/ 25 ppm TKPP | 165 | 14.28 | 64.75 |
| 2 ppm PEHA/ 5 ppm Deq. 2054 | 137 | 10.38 | 74.37 |

+this slight activity may be due to the phosphonate/phosphate adsorbing onto the solids and deactivating some of the catalytic surface sites for sulfite oxidation.
"Dequest 2000" = 50% active acid solution of

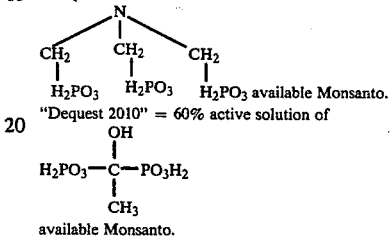

H₂PO₃ available Monsanto.
"Dequest 2010" = 60% active solution of $$H_2PO_3-\underset{\underset{CH_3}{|}}{\overset{\overset{OH}{|}}{C}}-PO_3H_2$$

available Monsanto.

TABLE IX 0.5% Fly Ash

| Treatment and Treatment Level | ppm Oxidized After 30 Minutes | Percent Oxidation After 30 Minutes | Percent Antioxidant Activity After 30 Minutes |
|---|---|---|---|
| Control | 417/416 $\bar{x}$ = 417 | 37.60/35.40 $\bar{x}$ = 36.40 | 0/0 $\bar{x}$ = 0 |
| 5 ppm TEPA | 356 | 37.32 | 0.00 |
| 5 ppm Deq. 2054 | 338 | 27.93 | 23.47 |
| 5 ppm TEPA/ 5 ppm Deq. 2054 | 317 | 29.94 | 20.71 |
| 10 ppm TEPA | 160 | 17.00 | 53.42 |
| 10 ppm TEPA/ 5 ppm Deq. 2054 | 162 | 14.18 | 61.15 |

TABLE X 1.0% Fly Ash

| Treatment and Treatment Level | ppm Oxidized After 30 Minutes | Percent Oxidation After 30 Minutes | Percent Antioxidant Activity After 30 Minutes |
|---|---|---|---|
| Control | 494/404/560 474/358 $\bar{x}$ = 458 | 40.99/35.78/ 43.44 43.11/37.10 $\bar{x}$ = 40.07 | 0/0/0/0/0 $\bar{x}$ = 0 |
| 2 ppm AO-23 | 419 | 34.95 | 12.70 |
| 25 ppm TKPP | 446 | 37.29 | 6.94 |
| 50 ppm STPP | 424 | 39.74 | 0.82 |
| 10 ppm TEPA | 498 | 45.77 | 0.00 |
| 15 ppm TEPA | 196 | 16.00 | 60.00 |
| 10 ppm Deq. 2054 | 494 | 43.18 | 0.00 |
| 10 ppm TEPA/ 5 ppm Deq. 2054 | 433 | 39.36 | 1.77 |
| 10 ppm TEPA/ 10 ppm Deq. 2054 | 405 | 34.32 | 14.35 |
| 15 ppm TEPA/ 5 ppm Deq. 2054 | 325 | 26.32 | 34.31 |
| 15 ppm TEPA/ 10 ppm Deq. 2054 | 85 | 8.47 | 78.86 |
| 5 ppm AO-23/ 10 ppm Deq. 2054 | 120 | 10.36 | 74.15 |
| 10 ppm AO-23/ 10 ppm Deq. 2054 | 107 | 8.52 | 78.73 |
| 5 ppm AO-23/ 25 ppm TKPP | 96 | 8.64 | 78.44 |
| 10 ppm AO-23/ | | | |

TABLE X-continued 1.0% Fly Ash

| Treatment and Treatment Level | ppm Oxidized After 30 Minutes | Percent Oxidation After 30 Minutes | Percent Antioxidant Activity After 30 Minutes |
|---|---|---|---|
| 25 ppm TKPP | 24 | 2.32 | 94.21 |

TABLE XI 0.1% Fly Ash

| Treatment and Treatment Level | ppm Oxidized After 30 Minutes | Percent Oxidation After 30 Minutes | Percent Antioxidant Activity After 30 Minutes |
|---|---|---|---|
| 5 ppm Combination | | | |
| A | 126 | 9.55 | 76.43 |
| B | 18 | 1.35 | 96.66 |
| C | 80 | 6.22 | 84.64 |
| 2 ppm Combination | | | |
| D | 0 | 0 | 100.00 |
| E | 0 | 0 | 100.00 |
| F | 89 | 6.03 | 85.11 |

Combination A = 6.6% Dequest 2000, 6.6% TEPA
Combination B = 6.6% Dequest 2010, 6.6% TEPA
Combination C = 6.6% Dequest 2054, 6.6% TEPA
Combination D = 5.0% Dequest 2000, 5% AO-23
Combination E = 5.0% Dequest 2010, 5% AO-23
Combination F = 5.0% Dequest 2054, 5% AO-23

With respect to Tables VII–XI herein, it is noted that the phosphonate (Dequest) materials showed only slight antioxidant activity when used alone. However, when used in combination with antioxidants and with fly ash solids present, these phosphonates significantly increased the activity of the antioxidants (See Table VIII).

The DETA and PEHA performed very much like TEPA. When no solids were present these compounds exhibited sulfite antioxidant activity. The DETA at comparable levels did not work as well as TEPA, while PEHA at comparable levels worked better than TEPA. With fly ash solids added to the system, the performance of these compounds deteriorated significantly. When phosphonates or phosphates were used in combination with these compounds their performance improved markedly (See Table VIII).

Several combination products were formulated. Their compositions are listed below Table XI. These compositions remained stable for 24 hours with no obvious signs of precipitation or phase separation. These "combined" compositions appear to be only slightly less active than when fed as dual products.

TABLE XII

No Solids

| Treatment and Treatment Level | ppm Oxidized After 30 Minutes | Percent Oxidation After 30 Minutes | Percent Antioxidant Activity After 30 Minutes |
|---|---|---|---|
| Control | 323/342/371 = $\bar{x}$ = 345 | 24.41/26.47/ 27.00 $\bar{x}$ = 25.96 | 0/0/0 $\bar{x}$ = 0 |
| 1 ppm AO-22 | 0 | 0 | 100.00 |
| 2 ppm DMPDS | 61 | 4.39 | 82.85 |

AO-22 is a chloride salt of N,N' Di-sec-butyl-p-phenylenediamine, available DuPont.
DMPDS = N,N-dimethyl-p-phenylenediamine sulfate

TABLE XIII 0.1% Fly Ash Solids

| Treatment and Treatment Level | ppm Oxidized After 30 Minutes | Percent Oxidation After 30 Minutes | Percent Antioxidant Activity After 30 Minutes |
|---|---|---|---|
| Control | 393/511/558/ 460/500 $\bar{x}$ = 484 | 36.39/42.65/ 42.44/39.48/ 41.56 $\bar{x}$ = 40.51 | 0/0/0 0/0 $\bar{x}$ = 0 |
| 1 ppm AO-22 | 370 | 28.24 | 30.28 |
| 3 ppm AO-22 | 0 | 0 | 100.00 |
| 5 ppm Deq. 2054/ 1 ppm AO-22 | 30 | 2.33 | 94.24 |
| 25 ppm TKPP/ 1 ppm AO-22 | 28 | 2.35 | 94.20 |
| 2 ppm DMPDS | 361 | 28.99 | 28.44 |
| 5 ppm DMPDS | 0 | 0 | 100.00 |
| 2 ppm DMPDS/ 5 ppm Deq. 2054 | 0 | 0 | 100.00 |
| 2 ppm DMPDS/ 25 ppm TKPP | 45 | 3.53 | 91.29 |

Tables XII and XIII show that, when no fly ash solids are present in the aqueous gas scrubber medium, the antioxidants (AO-22, DMPDS) show excellent activity. However, the antioxidant activity of these antioxidants deteriorates when solids (fly ash) are present. When the polyphosphates and phosphonates were added in addition to the antioxidants, in the presence of fly ash solids, the antioxidant activity increased significantly.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the appended claims.

Having described our invention we claim:

1. A method for inhibiting the amount of oxidation of sulfite to sulfate in a sulfite containing aqueous gas scrubber medium, said medium having solids particulate matter disposed therein, said method comprising adding to said medium an effective amount of a water soluble antioxidant additive adapted to inhibit said oxidation, and also adding an effective amount of a water soluble topping agent to said medium, wherein said topping agent comprises a member selected from the group consisting of polyphosphate compounds, organophosphonic acid compounds, oligomers of said phosphonic acid compounds and mixtures thereof.

2. The method as defined in claim 1 wherein said water soluble antioxidant additive comprises a member selected from the group consisting of aromatic amines, and linear polyethyleneamines and mixtures thereof.

3. The method as defined in claim 1 further comprising adding about 1–100 parts of said topping agent to said aqueous scrubber medium, based upon 1 million parts of said medium, and adding about 0.5–10 parts of said water soluble antioxidant additive to said medium, based upon 1 million parts of said medium.

4. The method as defined in claim 1 wherein said topping agent is added to said aqueous scrubber medium at a point prior to and sufficiently removed from the point wherein said water soluble antioxidant additive is added to said medium.

5. The method as defined in claim 1 wherein said topping agent and said water soluble antioxidant additive are added simultaneously and at the same point to said medium.

6. The method as defined in claim 1 wherein said polyphosphate compound is a member selected from the group consisting of:
$Na_5P_3O_{10}$ sodium tripolyphosphate
$Na_4P_2O_7$ tetrasodium pyrophosphate
$Na_2H_2P_2O_7$ disodium pyrophosphate
$(NaPO_3)_6$ sodium hexametaphosphate
$K_4P_2O_7$ tetrapotassium pyrophosphate
$Na_2(NH_4)_2P_2O_7$ sodium ammonium pyrophosphate
$Na_4HP_3O_{10}.1.5H_2O$ sodium acid tripolyphosphate
$K_5P_3O_{10}$ potassium tripolyphosphate
$Na_6P_4O_{13}$ sodium tetrapolyphosphate
$Na_3P_3O_9$ sodium trimetaphosphate
$Na_4P_4O_{12}$ sodium tetrametaphosphate
$(NaPO_3)_7$ sodium heptametaphosphate
$(NaPO_3)_8$ sodium octametaphosphate
and mixtures thereof.

7. The method as defined in claim 1 wherein said organo-phosphonic acid compound comprises a moiety represented by the formula:

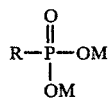

wherein
R = lower alkyl having from 1 to about 6 carbon atoms, OH or $NH_2$ substituted alkyl, a mononuclear aromatic radical, or an hydroxy, amino or lower alkyl substituted aromatic, and
M = a water soluble cation.

8. The method as defined in claim 1 wherein said organo-phosphonic acid compound comprises a moiety represented by the formula:

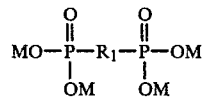

wherein
$R_1$ = an alkylene having from about 1 to about 12 carbon atoms, or a hydroxy or amino substituted alkylene having about 1 to about 12 carbon atoms, and
M = a water soluble cation.

9. The method as defined in claim 1 wherein said organo-phosphonic acid compound comprises a moiety represented by the formula:

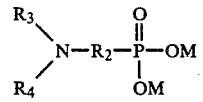

wherein
$R_2$ = lower alkylene having from about 1 to about 4 carbon atoms, or an amine or hydroxy substituted lower alkylene having from about 1 to about 4 carbon atoms,
$R_3$ = $[R_2-PO_3M_2]$, H, OH, amino, substituted amino, an alkyl having from about 1 to about 6 carbon atoms, an hydroxy or amino substituted alkyl having from about 1 to about 6 carbon atoms, a mononuclear aromatic radical, or an hydroxy or amino substituted mononuclear aromatic radical,
$R_4 = R_3$ or

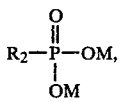

$R_5$ and $R_6$ = H, lower alkyl having from about 1 to 6 carbon atoms, an hydroxy or amino substituted lower alkyl, H, OH, amino, substituted amino, a mononuclear aromatic radical, or an hydroxy or amine substituted mononuclear aromatic radical,
$R_7 = R_5$, $R_6$ or $R_2-PO_3M_2$ wherein $R_2$ is as above described in this claim,
n = a number of from 1 through about 15,
y = a number of from about 1 through about 14, and
M = a water soluble cation.

10. A method for inhibiting the amount of oxidation of sulfite to sulfate in a sulfite-containing aqueous gas scrubber medium, said method comprising adding to said medium an effective amount of a water soluble antioxidant additive adapted to inhibit said oxidation, said medium having solids particulate matter disposed therein, and also adding an effective amount of a water soluble topping agent to said medium, wherein said topping agent comprises a member selected from the group consisting of: nitrilo-tri (methylenephosphonic acid) and water soluble salts thereof, hexamethylenediamine-N,N,N',N'-tetra (methylene phosphonic acid) and water soluble salts thereof, 1 hydroxy ethylidene-1,1-diphosphonic acid and water soluble salts thereof, sodium tripolyphosphate, and potassium tripolyphosphate, and mixtures thereof.

11. The method as recited in claim 10 wherein said water soluble antioxidant additive comprises a polyethyleneamine having the formula $NH_2(CH_2CH_2NH)_xH$ wherein X > 1.

12. The method as recited in claim 11 wherein X is about 2 to about 10.

13. The method as recited in claim 10 wherein said water soluble antioxidant additive comprises an aromatic amine having the formula:

wherein
$R_1$ = OH, $NHR_5$, lower alkyl having 1-3 carbon atoms, or,

$R_2$ = H, or OH with the proviso that $R_1$ = OH when $R_2$ = OH,
$R_3$ = H, or lower alkyl having 1 to 3 carbon atoms,
$R_4$ = H or $NHR_5$,
$R_5$ = H, or lower alkyl having 1 to 3 carbon atoms.

14. The method as recited in claim 12 wherein said linear polyethyleneamine is tetraethylenepentamine.

15. The method as recited in claim 12 wherein said linear polyethyleneamine is diethylenetriamine.

16. The method as recited in claim 12 wherein said linear polyethyleneamine is pentaethylenehexamine.

17. The method as defined in claim 13, wherein said aromatic amine is N,N dimethyl-p-phenylene diamine sulfate.

18. The method as defined in claim 13 wherein said aromatic amine is N,N' di-sec-butyl-p-phenylene diamine.

19. The method as defined in claim 13 wherein said aromatic amine is N,N' di-isopropyl-p-phenylene diamine.

20. Method as recited in claim 1 or 10, wherein said solids particulate matter comprises fly ash.

* * * * *